(12) United States Patent
Ma

(10) Patent No.: US 12,413,821 B2
(45) Date of Patent: Sep. 9, 2025

(54) WEB-BASED CONTENT PRESENTATION VIA SMART TELEVISION DEVICE APPLICATION

(71) Applicant: ROKU, INC., San Jose, CA (US)

(72) Inventor: Don Ma, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/228,413

(22) Filed: Jul. 31, 2023

(65) Prior Publication Data

US 2025/0047947 A1 Feb. 6, 2025

(51) Int. Cl.
*H04N 21/4782* (2011.01)
*H04N 21/431* (2011.01)

(52) U.S. Cl.
CPC ..... *H04N 21/4782* (2013.01); *H04N 21/4312* (2013.01)

(58) Field of Classification Search
CPC ............ H04N 21/4782; H04N 21/4312
See application file for complete search history.

(56) References Cited

U.S. PATENT DOCUMENTS

| 2012/0054616 A1* | 3/2012 | Mittal ................. G06F 3/00 |
| 2015/0026566 A1* | 1/2015 | Hui ................. G06F 17/2247 |
| 2018/0041567 A1* | 2/2018 | Kidambi ................. H04L 67/06 |
| 2018/0074795 A1* | 3/2018 | Benge ................ H04N 21/8545 |

\* cited by examiner

*Primary Examiner* — Anthony Bantamoi
(74) *Attorney, Agent, or Firm* — STERNE, KESSLER, GOLDSTEIN & FOX P.L.L.C.

(57) ABSTRACT

Disclosed herein are system, method and/or computer program product embodiments, and/or combinations and sub-combinations thereof, for presenting web-based content to a display by an application installed on a smart television (TV) device. An example embodiment includes a web-based content collection and transformation service that is configured to access web-based content via a world wide web, create a copy of the web-based content, transform the copy of the web-based content into a form suitable for presentation to the display by the application, and store the transformed copy of the web-based content to a data storage system that is accessible to the application. In further accordance with this example embodiment, the application is configured to obtain the transformed copy of the web-based content from the data storage system and present it to the display.

20 Claims, 6 Drawing Sheets

WEB-BASED CONTENT PRESENTATION VIA SMART TELEVISION DEVICE APPLICATION

BACKGROUND

Field

This disclosure is generally directed to techniques for presenting content to a display and, in particular, to techniques for presenting web-based content to a display.

SUMMARY

Provided herein are system, apparatus, article of manufacture, method and/or computer program product embodiments, and/or combinations and sub-combinations thereof, for presenting web-based content to a display by an application installed on a smart television (TV) device. An example embodiment includes a web-based content collection and transformation service that is configured to access web-based content via a world wide web ("web"), create a copy of the web-based content, transform the copy of the web-based content into a form suitable for presentation to the display by the application, and store the transformed copy of the web-based content to a data storage system that is accessible to the application. In further accordance with such an embodiment, the application is configured to obtain the transformed copy of the web-based content from the data storage system and present the transformed copy of the web-based content to the display.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
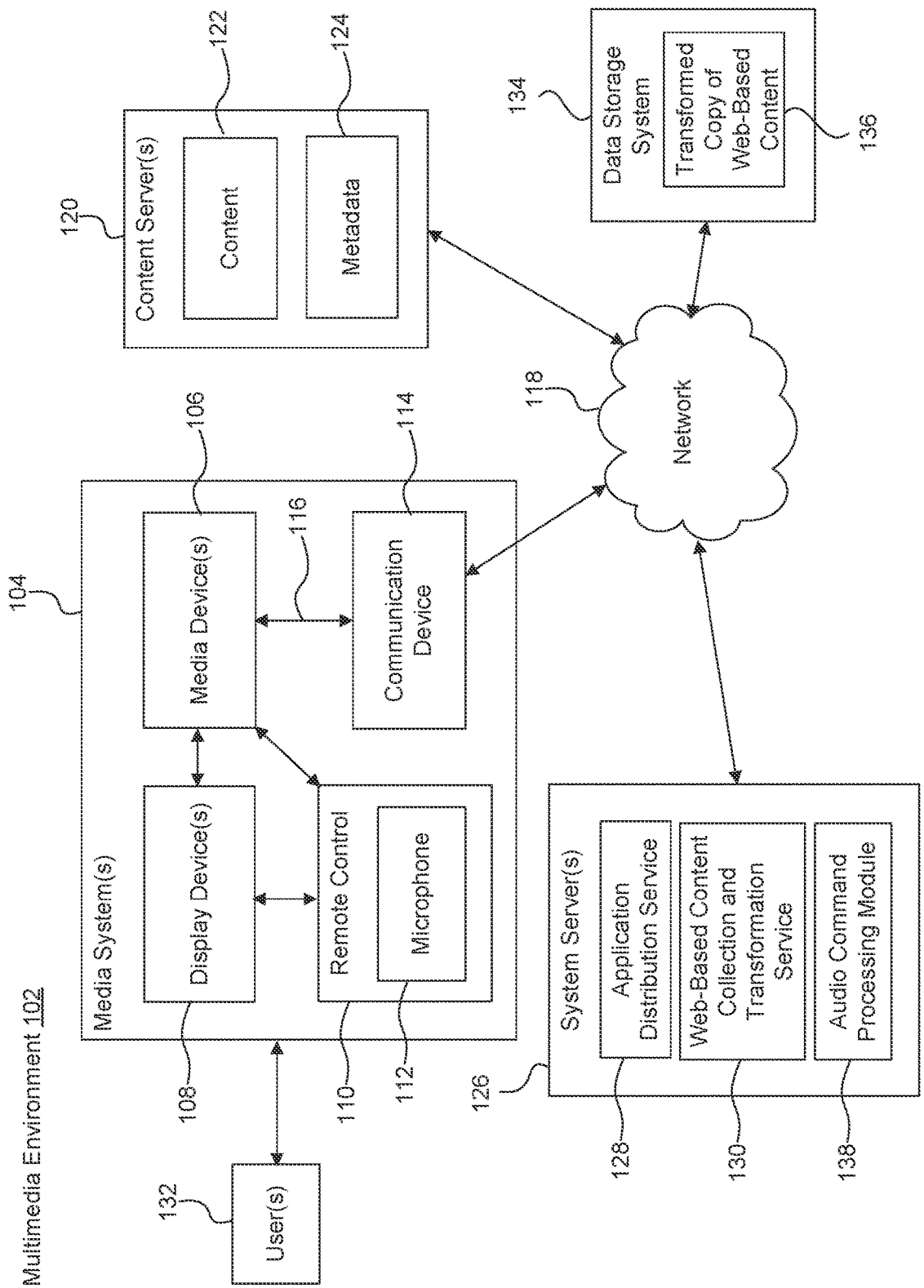
FIG. 1 illustrates a block diagram of a multimedia environment, according to some embodiments.

For a variety of reasons, a user may wish to display content accessed via the world wide web (e.g., a webpage, or text, image, video and/or audio content included within a webpage) on a relatively large screen as opposed to the relatively small screens typically associated with smart phones, laptop computers, tablet computers, and desktop computers. For example, in an enterprise, it may be deemed useful to display web-based content that is relevant to employees on a number of large screens distributed across one or more offices, thereby enabling the employees to easily view such web-based content. Likewise, in a retail store or restaurant, it may be deemed desirable to display web-based content to customers or patrons via a number of large screens distributed throughout a shopping or dining space. One approach to achieving this would be to physically connect a separate computer running a web browser to each such display and then navigate each such web browser to the desired content. However, this approach is both expensive and logistically complex.

Owing to significant advances in display technology and manufacturing, it is now possible for consumers to obtain large flat screen televisions (TVs) with display sizes ranging from 55 to 85 inches at a relatively low cost, with even larger display sizes available. Such large displays could potentially provide a more convenient and desirable way to view web-based content in the home as compared to the aforementioned relatively small screens typically associated with smart phones, laptop computers, tablet computers, and desktop computers. Also, such large displays could potentially provide a means for communal viewing of web-based content by a group of family members and/or friends in a home. One approach to achieving this would be to connect a computer with a web browser installed thereon to a TV and then operate the computer to navigate the web browser to the desired web-content. However, this approach is far from user-friendly, as it requires a user to physically connect the computer to an input port of the TV (assuming such an input port is even available), switch the TV to the relevant input port, and then navigate the web browser on the computer to the desired web content.

Provided herein are system, apparatus, device, method and/or computer program product embodiments, and/or combinations and sub-combinations thereof, for presenting web-based content to a display by an application installed on a smart TV device that addresses one or more of the foregoing issues. For example, as will be described herein, an application installed on a smart TV device (e.g., a smart TV or a device that connects to a TV to provide smart TV features thereto) may be used to present web-based content to a display. In particular, a web-based content collection and transformation service may operate to access the web-based content via a world wide web, create a copy of the web-based content, transform the copy of the web-based content into a form suitable for presentation to the display by the application, and store the transformed copy of the web-based content to a data storage system that is accessible to the application. The application may be configured to obtain the transformed copy of the web-based content from the data storage system and present the transformed copy of the web-based content to the display.

In accordance with the disclosed techniques for presenting web-based content via a smart TV device application, web-based content that would normally be accessed and viewed via the relatively small displays typically associated with smart phones, laptop computers, tablet computers, and desktop computers, can instead be viewed via the relatively large displays associated with some TVs, such as some flat screen TVs.

In further accordance with the disclosed techniques for presenting web-based content via a smart TV device application, the application for presenting the web-based content may be easily installed and executed on any number of smart TV devices, thereby enabling web-based content to be presented to any number of displays associated with any number of TVs, without having to connect a separate browser-enabled computer to each TV.

In still further accordance with the disclosed techniques for presenting web-based content via a smart TV device application, the aforementioned service automatically navigates the web to collect the web-based content, transforms the web-based content into a form suitable for display, and stores the transformed web-based content in the aforementioned data storage system, where it may be accessed by any number of applications executing on any number of smart TV devices. Because the service performs the web navigation operations to obtain the web-based content and the transformation operations to render it into a form suitable for display, the applications themselves need not perform such operations. This can enable the applications to be more lightweight or streamlined, thus consuming fewer resources (e.g., processor cycles, memory) of the smart TV devices upon which they are installed.

In yet further accordance with the disclosed techniques for presenting web-based content via a smart TV device application, the web-based content that is presented to the display may be automatically collected by the aforementioned service and transformed into a form suitable for presentation to the display by the application. This can entail, for example, transforming the web-based content into a form that can be viewed or otherwise consumed using a remote control associated with the smart TV device, which may provide a far simpler control scheme as compared to a conventional computer and web browser. Thus, a user may be enabled to consume web-based content using such far simpler control scheme.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Media device 106 may comprise a smart TV device. As used herein, the term "smart TV device" is intended to encompass TVs with integrated processing and digital communication capabilities, as well as devices (e.g., streaming media devices or set-top boxes) that connect to TVs and provide smart TV functionality thereto. As will be discussed herein, such smart TV functionality may include, for example, and without limitation, the ability to execute applications that obtain content via the Internet and present such content to a display, such as display device 108.

Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

System servers 126 may include an application distribution service 128. Application distribution service 128 may enable user 132 to browse a plurality of smart TV device applications and select certain smart TV device applications from among the plurality of smart TV device applications for installation to media device 106. For example, media device 106 may present a user interface (UI), such as a graphical UI (GUI), associated with application distribution service 128 to display device 108. A user may interact with the UI (e.g., by using remote control 110) to browse a plurality of smart TV device applications and to select one of the plurality of smart TV device applications for installation on media device 106. In response to such selection, application distribution service 128 may cause the selected smart TV device application to be downloaded and installed on media device 106. As will be discussed below in reference to FIG. 2, such smart TV device applications may include a web-based content presentation application 210 that may be installed on media device 106 and subsequently executed to present certain web-based content to display device 108.

System servers 126 may also include a web-based content collection and transformation service 130. Web-based content collection and transformation service 130 may operate to access web-based content via the world wide web (e.g., via network 118), create a copy of the web-based content, and transform the copy of the web-based content into a form suitable for presentation to a display (e.g., display device 108) by the aforementioned web-based content presentation application 210, thereby generating a transformed copy of web-based content 136. Web-based content collection and transformation service 130 may further operate to store transformed copy of web-based content 136 to a data storage system 134 that is communicatively connected to network 118 and that is accessible to application 210 installed on media device 106 via network 118.

System servers 126 may also include an audio command processing module 138. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which then forwards the audio data to audio command processing module 138 in system servers 126. Audio command processing module 138 may operate to process and analyze the received audio data to recognize a verbal command of user 132. Audio command processing module 138 may then forward the verbal command back to media device 106 for processing.

Figure 2:
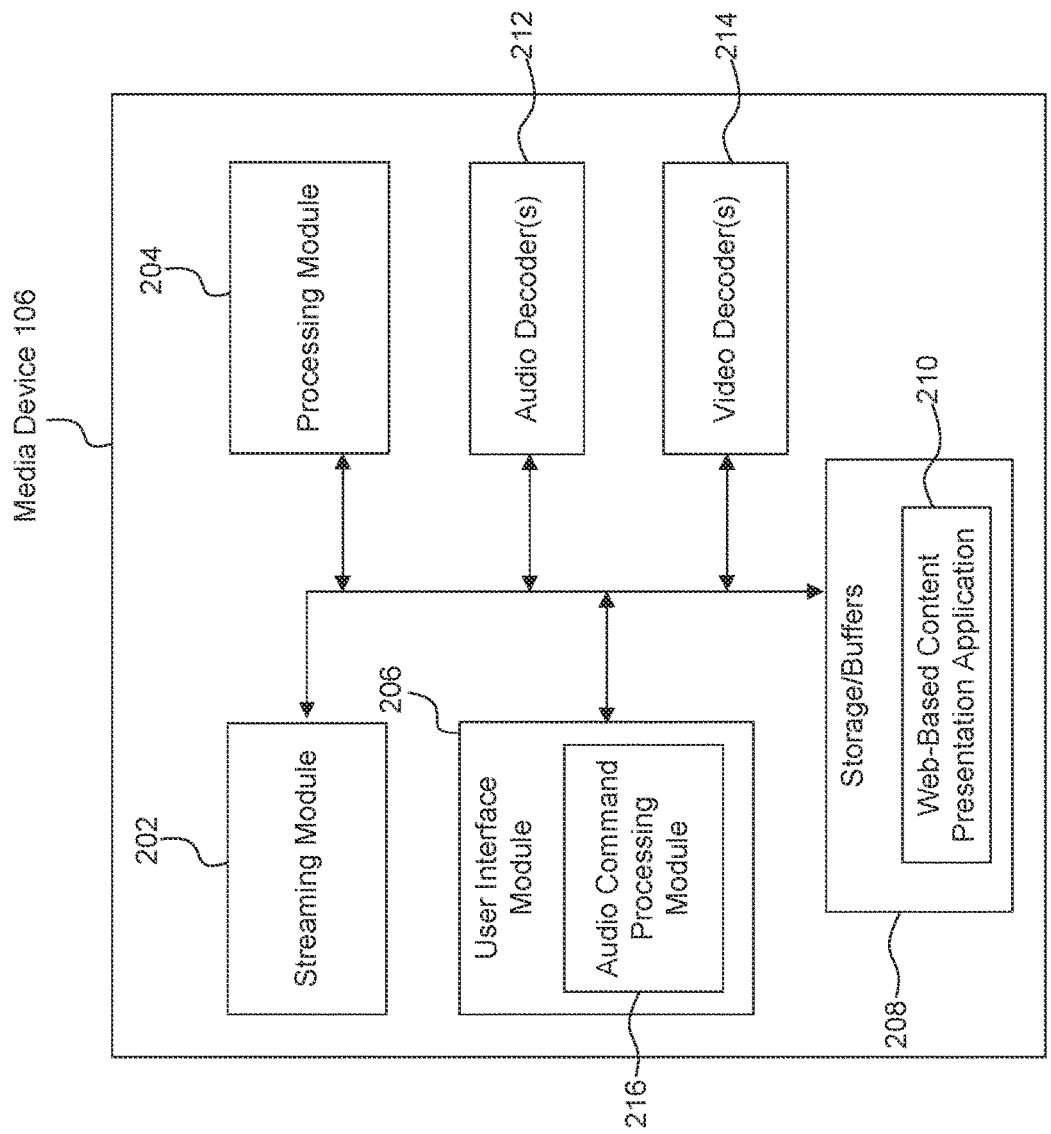
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 138 in system servers 126, or the verbal command recognized by audio command processing module 216 in media device 106).

Multimedia environment 102 may include a data storage system 134. Data storage system 134 may store transformed copy of web-based content 136 generated by web-based content collection and transformation service 130, so that such transformed copy of web-based content 136 can be obtained therefrom by various instances of web-based content presentation application 210 installed respectively on various media devices, such as media device 106. Data storage system 134 may comprise, for example, a cloud-based data storage system. However, this is only one non-limiting example and data storage system 134 may be implemented by one or more computing devices (e.g., servers) using any suitable data storage technology, including but not limited to direct attached storage (DAS) or network-based storage. Furthermore, data storage system 134 may be implemented using any suitable data storage devices, including but not limited to hard disk drives (HDDs), solid state drives (SSDs), flash drives, tape drives, or the like. In certain implementation, data storage system 134 may comprise part of content server(s) 120, in which case data storage system 134 may also store content 122 and/or metadata 124.

FIG. 2 illustrates a block diagram of an example media device 106, according to some embodiments. Media device 106 may include a streaming module 202, a processing module 204, storage/buffers 208, a user interface module 206, and a streaming media context classification module 218. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H 265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select a content item, such as a movie, TV show, music, book, application, game, etc. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

In further embodiments, user 132 may interact with user interface module 206 of media device 106 (e.g., using remote control 110) to select web-based content presentation application 210 from among a plurality of smart TV device applications made available by application distribution service 128. In response to such selection, application distribution service 128 may cause application 210 to be downloaded to and installed on media device 106. For example, application 210 may be installed to storage/buffers 208 of media device 106, as shown in FIG. 2. Once application 210 has been installed to media device 106, user 132 may interact with user interface module 206 of media device 106 (e.g., using remote control 110) to cause application 210 to be executed by processing module 204. During execution, web-based content presentation application 210 may operate to obtain transformed copy of web-based content 136 from data storage system 134 and present it to display device 108 so that user 132 may view it.

In alternative implementations, application 210 may be pre-installed on media device 106 at a time of manufacture of media device 106 and thus need not be installed thereon by user 132.

Web-Based Content Presentation Via Smart Television Device Application

Referring again to FIGS. 1 and 2, web-based content collection and transformation service 130 may operate to access web-based content via the world wide web (e.g., via network 118), create a copy of the web-based content, transform the copy of the web-based content into a form suitable for presentation to a display (e.g., display device 108) by web-based content presentation application 210, thereby generating transformed copy of web-based content 136, and store transformed copy of web-based content 136 to data storage system 134 that is accessible to application 210. Application 210 installed on media device 106 may operate to obtain transformed copy of web-based content 136 from data storage system 134 and present it to a display (e.g., display device 108).

Figure 3:
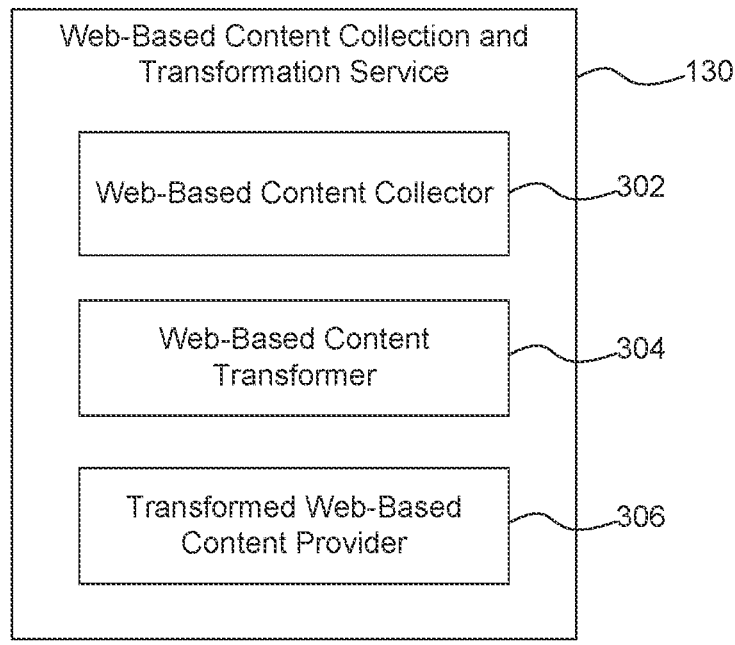
FIG. 3 illustrates a block diagram of a web-based content collection and transformation service, according to some embodiments.

FIG. 3 illustrates a block diagram of an example implementation of web-based content collection and transformation service 130, according to some embodiments. As shown in FIG. 3, web-based content collection and transformation service 130 may comprise a web-based content collector 302, a web-based content transformer 304, and a transformed web-based content provider 306. Each of these components may be implemented by processing logic that can comprise hardware (e.g., circuitry, dedicated logic, programmable logic, microcode, etc.), software (e.g., instructions executing on a processing device), or a combination thereof. Each of these components will now be described.

Web-based content collector 302 may be configured to access web-based content via the world wide web (e.g., via network 118), create a copy of the web-based content, and provide the copy of the web-based content to web-based content transformer 304. The web-based content may comprise any type of content that can be accessed via the web. For example and without limitation, the web-based content may comprise a webpage (e.g., a rendered webpage and/or source HTML of a webpage), as well as any text, image, audio content and/or video content included in a webpage, an RSS feed, or the like. Web-based content collector 302 may be configure to retrieve the aforementioned web-based content from a single webpage or from across a plurality of webpages.

Web based content collector 302 may include a headless web browser. Web based content collector 302 may utilize the headless web browser to navigate to a webpage and capture a screenshot of the webpage without having to render the webpage to a screen.

Web based content collector 302 may also comprise a headful (or GUI-based) web browser. Web based content collector 302 may utilize the headful web browser to navigate to a webpage and render the webpage to a browser window that is displayed on a screen. Web based content collector 302 may then capture a screenshot of the webpage when rendered to the screen. If the webpage extends beyond the boundaries of the browser window, web based content collector 302 may automatically scroll down the webpage and take multiple screenshots to capture the entirety of the webpage.

In a scenario in which the web-based content comprises an image, web based content collector 302 may create a copy of the image by obtaining a copy of the contents of an associated image file without rendering the image, if such image file is available. Alternatively, web based content collector 302 may cause the image to be rendered and then create the copy of the image by capturing a screenshot of the rendered image.

In a scenario in which the web-based content comprises audio content, web based content collector 302 may create a copy of the audio content by obtaining a copy of the contents of an associated audio file without playing back the audio content, if such audio file is available. Alternatively, web based content collector 302 may create a copy of the audio content by playing back the audio content and recording the audio output during playback.

In a scenario in which the web-based content comprises video content, web based content collector 302 may create a copy of the video content by obtaining a copy of the contents of an associated video file without playing back the video, if such video file is available. Alternatively, web based content collector 302 may create a copy of the video content by playing back the video content and recording the video output during playback.

Web-based content may also include, for example, Portable Document Format (PDF) file content that is accessed via the web. Such PDF file content may include PDF content rendered to a browser window (e.g., using a suitable browser plugin) or raw PDF content. Web-based content collector 302 may generate a copy of PDF file content by taking a screenshot of such PDF content when rendered by a browser or by obtaining a copy of the raw PDF content.

Web-based content may also include, for example, markup language content (e.g., XML file content) that is accessed via the web (e.g., an RSS feed). Such markup language content may include markup language content rendered to a browser window (e.g., using a suitable browser plugin) or raw markup language content. Web-based content collector 302 may generate a copy of markup language content by listing out of such markup language content when rendered by a browser or by obtaining a copy of the raw markup language content.

Web-based content collector 302 may itself comprise an application that is configured to generate web-based content.

For example and without limitation, web-based content collector 302 may comprise a business intelligence application that is configured to generate one or more reports or graphs that are accessible via the web. In accordance with such an implementation, the application may be configured to automatically capture a copy of the reports or graphs and provide them to web-based content transformer 304.

Web-based content collector 302 may access the web-based content by placing an application programming interface (API) call to a service that returns web-based content responsive to the API call. For example, web-based content collector 302 may place an API call to a social networking service and, responsive to the API call, the social networking service may provide the web-based content (e.g., user-shared text messages, images and/or videos) to web-based content collector 302. As another example, web-based content collector 302 may place an API call to an artificial intelligence (AI) service and, responsive to the API call, the AI service may provide the web-based content (e.g., AI-generated stories, computer code, query or question responses, language translations, text summaries, or images) to web-based content collector 302.

Web-based content transformer 304 may be configured to receive the copy of the web-based content captured by web-based content collector 302 and transform the copy of the web-based content into a form suitable for presentation to a display (e.g., display device 108) by web-based content presentation application 210 installed on media device 106.

For example, in a scenario in which the copy of the web-based content comprises a screenshot of a webpage, web-based content transformer 304 may transform the copy of the web-based content into the form suitable for presentation to the display by partitioning the screenshot of the webpage into multiple images, each of which can be independently presented to the display. This approach may be desirable if the webpage is too large to fit within the display window or if the webpage can only be fit within the display window using a pixel resolution that renders image or video content difficult to see and/or text content difficult to read.

In further accordance with this example, web-based content transformer 304 may also automatically annotate one or more images of the aforementioned multiple images. The annotations added to an image may comprise, for example and without limitation, text annotations that are descriptive, evaluative or informative in nature with respect to the content included in each image. Web-based content transformer 304 may associate predefined annotations to each image. Alternatively, web-based content transformer 304 may utilize a machine learning (ML) model or other suitable algorithm to recognize image content and associate annotations therewith based on the nature of the image content.

In another example in which the copy of the web-based content comprises a screenshot of a web page, web-based content transformer 304 may transform the copy of the web-based content into the form suitable for presentation to the display by identifying portions of the webpage that are relevant to one or more users of web-based content presentation application 210, and then capturing an image of each of the identified portions of the webpage. In this way, only those portions of the webpage deemed relevant to the user(s) may be presented thereto by application 210. Web-based content transformer 304 may identify the portions of the webpage that are relevant to the user(s), for example, based on a user profile or other information associated with the user(s). Web-based content transformer 304 may alternatively identify the portions of the webpage that are relevant to the user(s) using a machine learning (ML) model that has been trained to predict content of interest to the user(s), or by using any other suitable algorithm.

In a scenario in which the copy of the web-based content comprises a copy of an image, web-based content transformer 304 may transform the copy of the web-based content into the form suitable for presentation to the display by changing a size, resolution, brightness, contrast, color, and/or any other aspect of the copy of the image.

In a scenario in which the copy of the web-based content comprises a copy of audio content, web-based content transformer 304 may transform the copy of the web-based content into the form suitable for presentation to the display by changing an audio format, encoding type, compression rate, amplitude resolution, sampling rate, and/or any other aspect of the copy of the audio content.

In a scenario in which the copy of the web-based content comprises a copy of video content, web-based content transformer 304 may transform the copy of the web-based content into the form suitable for presentation to the display by changing a resolution, aspect ratio, video format, encoding type, frame rate, bit rate, color space, and/or any other aspect of the copy of the audio content.

Web-based content transformer 304 may transform the copy of the web-based content into the form suitable for presentation to the display by (i) identifying one or more portions of the content in the copy of the web-based content to exclude from presentation to the display and then (ii) generating the transformed copy of the web-based content by removing the identified one or more portions of content from the copy of the web-based content. Such an approach may be used, for example, to selectively remove ads, pop-ups, or other undesired content from the copy of the web-based content. Such an approach may also be used, for example, to selectively remove copyright-protected material from the copy of the web-based content.

Web-based content transformer 304 may transform the copy of the web-based content into the form suitable for presentation to the display by adding content thereto. For example, web-based content transformer 304 may add a title, background image, video, advertisements or the like to the copy of the web-based content.

Web-based content transformer 304 may transform the copy of the web-based content into the form suitable for presentation to the display by (i) identifying one or more portions of content in the copy of the web-based content to present to the display and then (ii) generating the transformed copy of the web-based content from the identified one or more portions of content. Such an approach may be used, for example, to extract content of interest from among a broader set of web-based content collected by web-based content collector 302 and to condense or aggregate that web-based content into a more compact form for presentation to the display.

Web-based content transformer 304 may transform the copy of the web-based content into the form suitable for presentation to the display by transforming the copy of the web-based content into multiple different formats each of which is associated with a different display type. This can enable web-based content presentation application 210 to selectively obtain and present the transformed copy of the web-based content having a format that best suits the display (e.g., display device 108) to which the web-based content will be presented. For example, web-based content transformer 304 may transform the copy of the web-based content into multiple different formats corresponding, respectively, to multiple different display device types, display models, display sizes, or the like.

Web-based content transformer 304 may transform the copy of the web-based content into the form suitable for presentation to the display by tagging a GUI control within the copy of the web-based content. This can enable web-based content presentation application 210 to facilitate user interaction with the tagged GUI control, e.g., through the user of remote control 110 associated with media device 106. For example, web-based content transformer 304 may tag a GUI control within the copy of the web-based content as a button and application 210 may accordingly enable a user to activate the GUI control by highlighting the GUI control, e.g., by using a directional pad or touch pad of remote control 110, and then pressing an "OK" button or other button on remote control 110. Application 210 may then perform some action based on the user interaction with the button.

Transformed web-based content provider 306 may be configured to store transformed copy of web-based content 136 generated by web-based content transformer 304 to data storage system 134 that is accessible to web-based content presentation application 210 installed on media device 106. Data storage system 134 may further be accessible to additional instances of web-based content presentation application 210 respectively installed on additional media devices (e.g., smart TV devices), wherein each instance of web-based content presentation application 210 is configured to obtain transformed copy of web-based content 136 from data storage system 134 and present it to a corresponding display.

Figure 4:
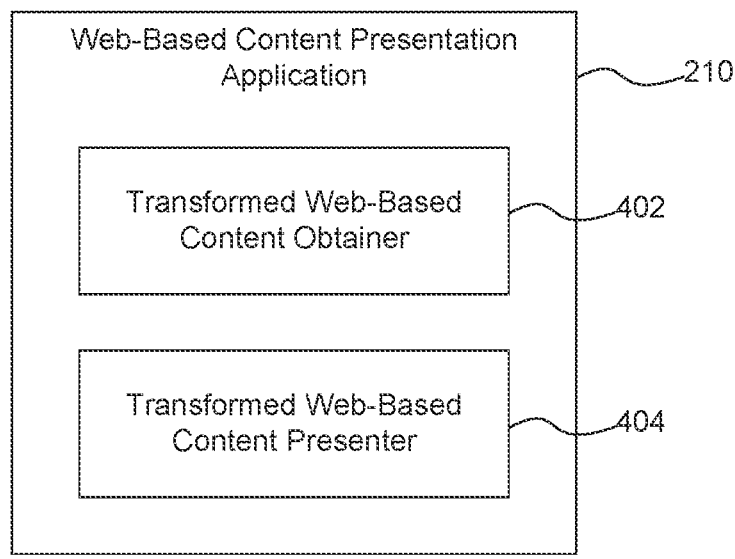
FIG. 4 illustrates a block diagram of a web-based content presentation application, according to some embodiments.

FIG. 4 illustrates a block diagram of an example implementation of web-based content presentation application 210, according to some embodiments. As previously described, web-based content presentation 210 may be installed and executed on media device 106, as well as on any number of additional media devices. As shown in FIG. 4, web-based content presentation application 210 may comprise a transformed web-based content obtainer 402 and a transformed web-based content presenter 404. Each of these components may be implemented by processing logic that can comprise hardware (e.g., circuitry, dedicated logic, programmable logic, microcode, etc.), software (e.g., instructions executing on a processing device), or a combination thereof. Each of these components will now be described.

Transformed web-based content obtainer 402 may be configured to obtain transformed copy of web-based content 136 from data storage system 134. In a scenario in which web-based content transformer 304 transforms the copy of the web-based content into multiple different formats each of which is associated with a different display type, transformed web-based content obtainer 402 may selectively obtain the transformed copy of the web-based content having a format that best suits the display (e.g., display device 108) to which the web-based content will be presented. For example, transformed web-based content obtainer 402 may obtain a transformed copy of the web-based content having a format that is associated with a display type of display device 108.

In certain implementations, after obtaining transformed copy of web-based content 136 from data storage system 134, transformed web-based content obtainer 402 may store transformed copy of web-based content 136 to a cache within media device 106. Thereafter, when application 210 is required to access transformed copy of web-based content 136, it may access it from the cache, thus avoiding having to obtain transformed copy of web-based content 136 from the remote data storage system 134. In further accordance with such an implementation, application 210 may purge transformed copy of web-based content 136 from the cache for a variety of reasons. For example, application 210 may purge transformed copy of web-based content 136 from the cache after expiration of a particular time period, to accommodate other cached content, or in response to receiving a notification from web-based content collection and transformation service 130 or data storage system 134 that an updated version of transformed copy of web-based content 136 is available. Once transformed copy of web-based content 136 is purged from the cache, transformed web-based content obtainer 402 will again need to obtain transformed copy of web-based content 136 from data storage system 134.

Transformed web-based content presenter 404 may be configured to present transformed copy of web-based content 136 to a display (e.g., display device 108). In particular, transformed web-based content presenter 404 may be configured to present images, video content and/or audio content that comprise transformed copy of web-based content 136 to the display.

For example, in a scenario in which transformed copy of web-based content 136 comprises multiple images generated through partitioning of a screenshot of a webpage, transformed web-based content presenter 404 may sequentially present each image of the multiple images to the display. In further accordance with such an implementation, transformed web-based content presenter 404 may enable a user to fast forward, rewind or pause the sequential presentation of each image of the multiple images. For example, transformed web-based content presenter 404 may enable user 132 to use remote control 110 to fast forward, rewind or pause the sequential presentation of each mage of the multiple images.

Transformed web-based content presenter 404 may be configured to enable a user to control the presentation of transformed copy of web-based content 136 to the display using only a remote control device. For example, transformed web-based content presenter 404 may be configured to enable user 132 to control the presentation of transformed copy of web-based content to display device 108 using remote control 110.

In scenarios in which the web-based content collected by web-based content collection and transformation service 130 is updated over time, web-based content collection and transformation service 130 may be configured to periodically or intermittently access the updated web-based content, create a copy of the updated web-based content, transform the copy of the updated web-based content into a form suitable for presentation to a display by application 210, and store the transformed copy of the updated web-based content to data storage system 134, where it may be accessed by application 210. This beneficially enables application 210 to present updated versions of the web-based content to display device 108. Web-based content collection and transformation service 130 may perform the foregoing operations in response to determining that the web-based content has been updated. Web-based content collection and transformation service 130 may determine that the web-based content has been updated, for example, by monitoring the web-based content or by receiving a notification that the web-based content has been updated.

The foregoing system for presenting web-based content by a smart TV device application may include various security features for to ensure that only certain parties are able to access the web-based content. For example, application distribution service 128 may only allow certain authenticated and/or authorized users or devices to download and install web-based content presentation application 210. Furthermore, application 210 itself may implement user authentication and/or authorization features to restrict which users or devices may execute the features of the application. Still further, data storage system 134 may store transformed copy of web-based content 136 in a secure manner. For example, data storage system 134 may only allow certain instances of application 210 or smart TV devices to access transformed copy of web-based content 136. As another example, data storage system 134 may store and provide transformed copy of web-based content 136 in an encrypted state and only trusted version of application 210 may be provided with a decryption key for decrypting the same.

The foregoing system for presenting web-based content by a smart TV device application may be used in a variety of ways. For example, the foregoing system may be used to display web-based reports and graphs (e.g., reports and graphs generated by a web-based business intelligence platform) that are relevant to employees of an enterprise to any number of large screen TVs distributed across one or more offices, thereby enabling the employees to easily view such web-based content. Likewise, in a retail store or restaurant, the foregoing system may be used to display web-based content (e.g., an online menu) to customers or patrons via a number of large screen TVs distributed throughout a shopping or dining space. Other example uses of the system may include, but are not limited to: a system that automatically browses the web (e.g., news websites) to collect information of interest to one or more users and consolidates that information (e.g., into a digest) on a periodic (e.g., daily or weekly) basis, so that the user(s) may then view the information via their TV(s); or a system that enables users to automatically share their own web-based content (e.g., personal pictures and videos previously uploaded to a social network website) with other users, such as family and friends, so that they can easily view it on their TVs. However, these are merely a few examples and persons skilled in the relevant art(s) will appreciate that the above-described system may be used in a multitude of other ways.

Figure 5:
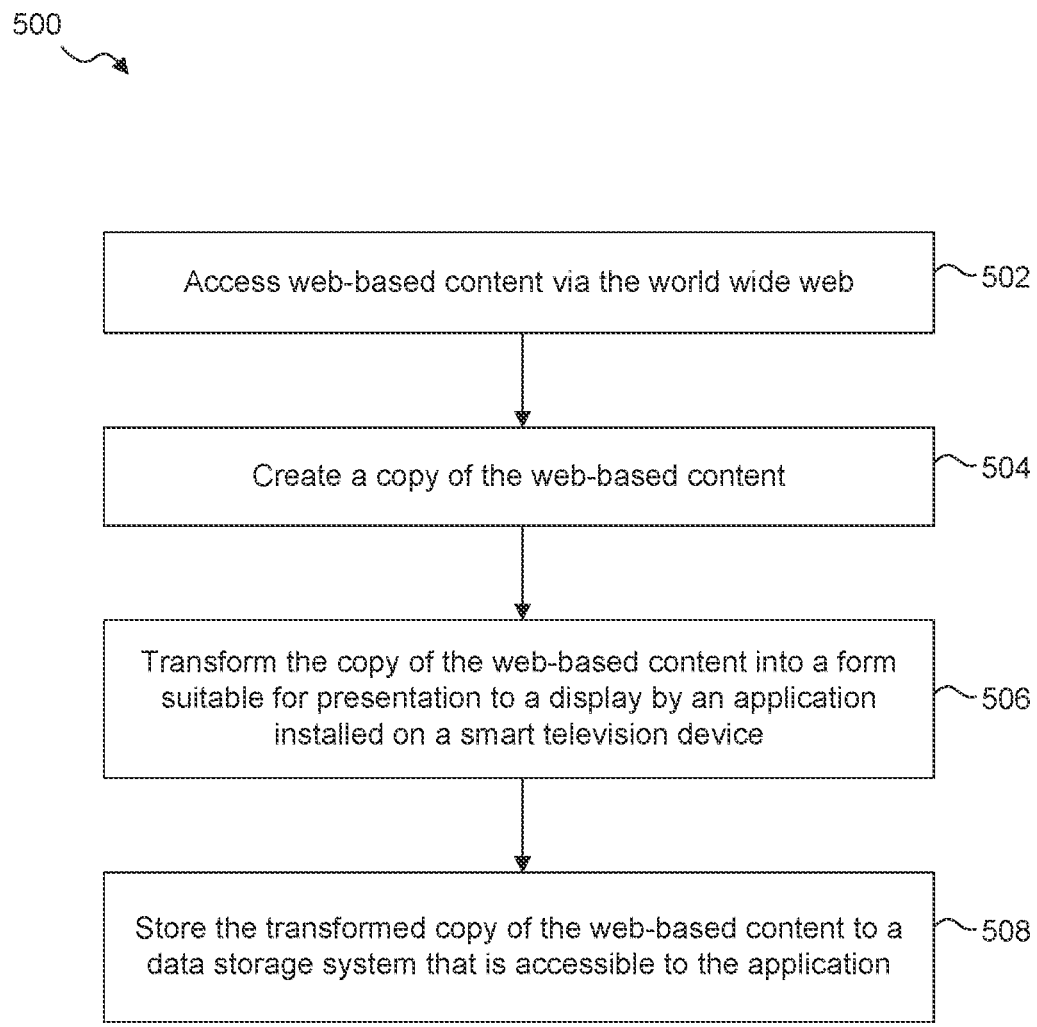
FIG. 5 illustrates a flow diagram of a method for collecting web-based content and transforming and storing the same so that it may be presented to a display by an application installed on a smart television device, according to some embodiments.

FIG. 5 is a flow diagram for a method 500 for collecting web-based content and transforming and storing the same so that it may be presented to a display by an application installed on a smart TV device, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to web-based content collection and transformation service 130 of FIGS. 1 and 3, although method 500 is not limited to that embodiment.

In 502, web-based content collector 302 accesses web-based content via the world wide web (e.g., network 118).

In 504, web-based content collector 302 creates a copy of the web-based content.

In 506, web-based content transformer 304 transforms the copy of the web-based content into a form suitable for presentation to a display (e.g., display device 108) by an application (e.g., web-based content presentation application 210) installed on a smart TV device (e.g., media device 106), thereby generating transformed copy of web-based content 136.

In 508, transformed web-based content provider 306 stores transformed copy of web-based content 136 to data storage system 134 that is accessible to the application (e.g., web-based content presentation application 210) installed on the smart TV device (e.g., media device 106).

Figure 6:
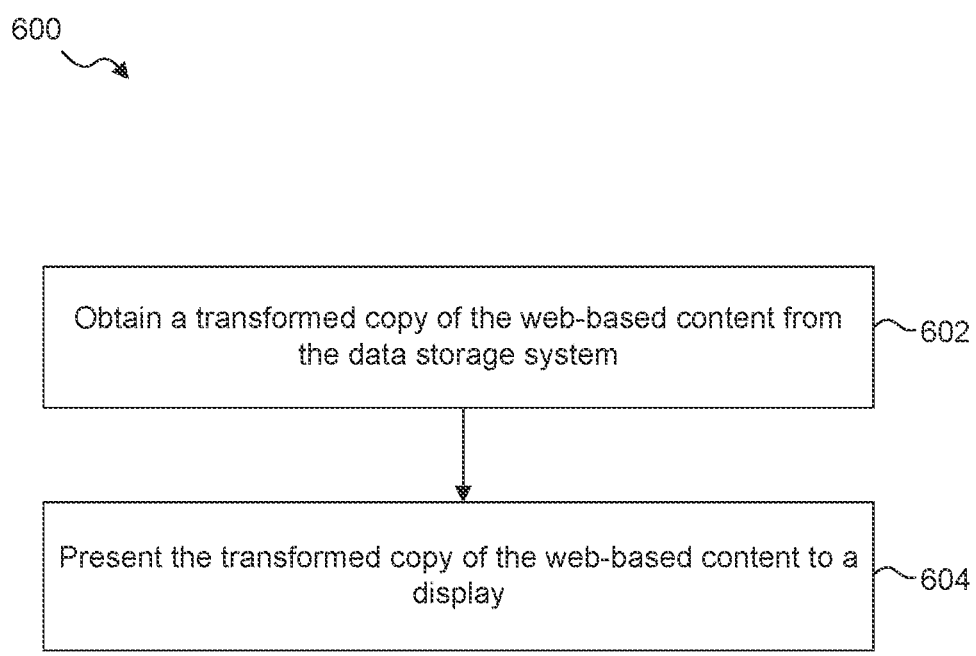
FIG. 6 illustrates a flow diagram of a method performed by an application installed on a smart television device for obtaining a transformed copy of web-based content and presenting the same to a display, according to some embodiments.

FIG. 6 is a flow diagram for a method 600 performed by an application installed on a smart television device for obtaining a transformed copy of web-based content and presenting the same to a display, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to web-based content presentation application 210 of FIGS. 1 and 4, although method 600 is not limited to those embodiments.

In 602, transformed web-based content obtainer 402 obtains transformed copy of web-based content 136 from data storage system 134.

In 602, transformed web-based content presenter 404 presents transformed copy of web-based content 136 to a display (e.g., display device 108).

Example Computer System

Figure 7:
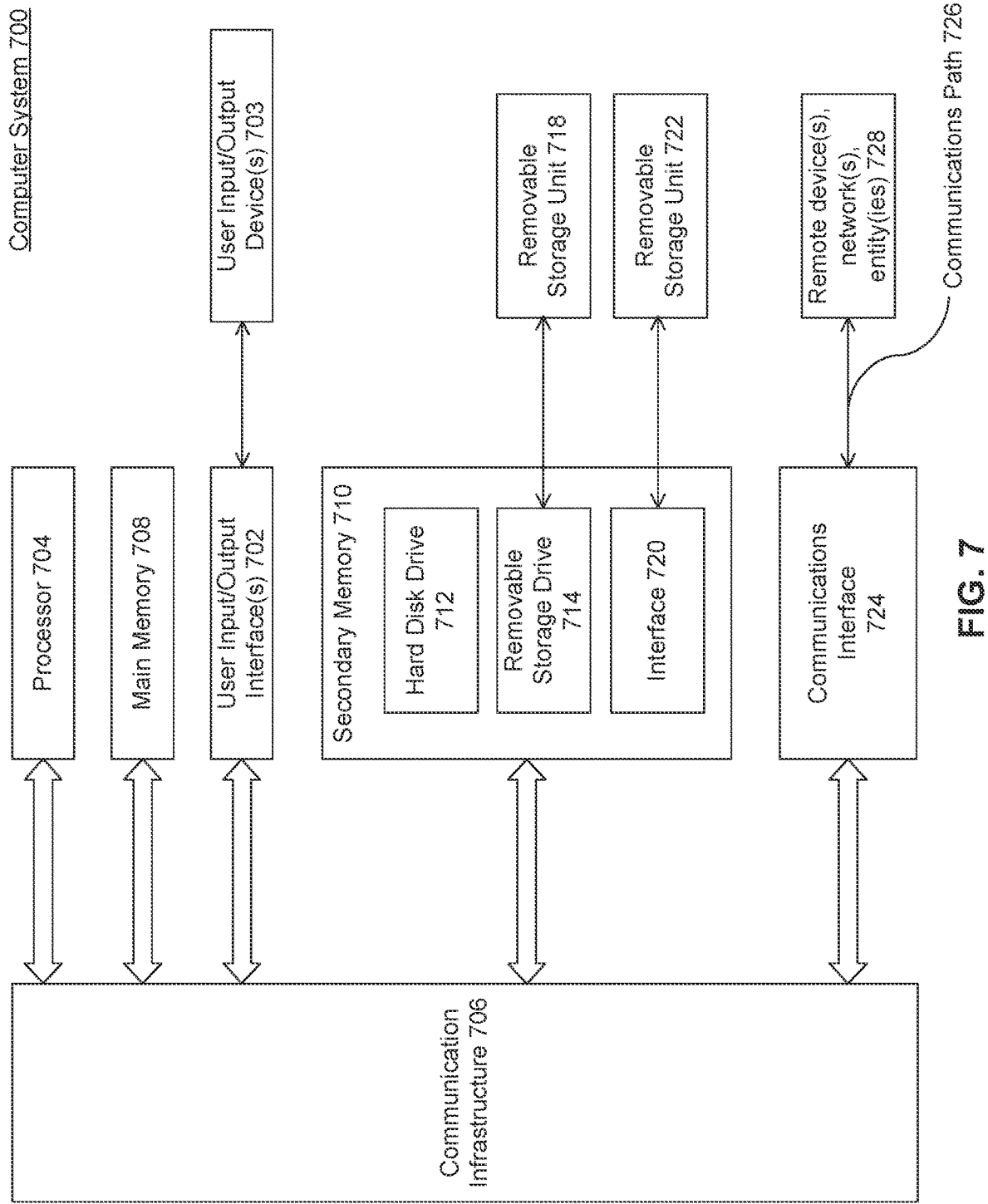
FIG. 7 illustrates an example computer system useful for implementing various embodiments.

Various embodiments may be implemented, for example, using one or more well-known computer systems, such as computer system 700 shown in FIG. 7. For example, one or more of media device 106, remote control 110, content server(s) 120, system server(s) 126, application distribution service 128, web-based content collection and transformation service 130, or web-based content presentation application 210 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for presenting web-based content to a display by an application installed on a smart television device, comprising:
    accessing, by at least one computer processor, the web-based content via a world wide web;
    creating a copy of the web-based content;
    transforming the copy of the web-based content into a form suitable for presentation to the display by the application, wherein the transformed copy of the web-based content comprises multiple images; and
    storing the transformed copy of the web-based content to a data storage system that is accessible to the application, wherein the application is configured to obtain the transformed copy of the web-based content from the data storage system and present it to the display, wherein the data storage system stores content and metadata.

2. The computer-implemented method of claim 1, wherein the smart television device comprises:
    a smart television that includes the display; or
    a media device that is separate from but communicatively connected to the display.

3. The computer-implemented method of claim 1, wherein the web-based content comprises a webpage and wherein creating the copy of the web-based content comprises:
    capturing a screenshot of the webpage.

4. The computer-implemented method of claim 3, wherein transforming the copy of the web-based content into the form suitable for presentation to the display by the application comprises:
    partitioning the screenshot of the webpage into the multiple images.

5. The computer-implemented method of claim 4, wherein the application is further configured to sequentially present each image of the multiple images to the display.

6. The computer-implemented method of claim 5, further comprising:
    annotating one or more images of the multiple images.

7. The computer-implemented method of claim 1, wherein storing the transformed copy of the web-based content to the data storage system comprises:
    storing the transformed copy of the web-based content to the data storage system that is accessible to multiple instances of the application respectively installed on multiple smart television devices, wherein each instance of the application in the multiple instances of the application is configured to obtain the transformed copy of the web-based content from the data storage system and present it to a corresponding display.

8. The computer-implemented method of claim 1, wherein the web-based content is updated over time, and wherein the accessing, creating, transforming and storing are performed periodically or intermittently to enable updated versions of the web-based content to be presented by the application.

9. The computer-implemented method of claim 1, wherein transforming the copy of the web-based content into the form suitable for presentation to the display by the application comprises transforming the copy of the web-based content into multiple different formats each of which is associated with a different display type; and
    wherein the application is configured to obtain a transformed copy of the web-based content having a format that is associated with a display type of the display.

10. A system for presenting web-based content to a display by an application installed on a smart television device, comprising:
    one or more memories; and
    at least one processor each coupled to at least one of the memories and configured to perform operations comprising:
    accessing the web-based content via a world wide web;
    creating a copy of the web-based content;
    transforming the copy of the web-based content into a form suitable for presentation to the display by the application, wherein the transformed copy of the web-based content comprises multiple images; and
    storing the transformed copy of the web-based content to a data storage system that is accessible to the application, wherein the application is configured to obtain the transformed copy of the web-based content from the data storage system and present it to the display, wherein the data storage system stores content and metadata.

11. The system of claim 10, wherein the smart television device comprises:
    a smart television that includes the display; or
    a media device that is separate from but communicatively connected to the display.

12. The system of claim 10, wherein the web-based content comprises a webpage and wherein creating the copy of the web-based content comprises:
    capturing a screenshot of the webpage.

13. The system of claim 12, wherein transforming the copy of the web-based content into the form suitable for presentation to the display by the application comprises:
    partitioning the screenshot of the webpage into the multiple images.

14. The system of claim 13, wherein the application is further configured to sequentially present each image of the multiple images to the display.

15. The system of claim 13, wherein the operations further comprise:
    annotating one or more images of the multiple images.

16. The system of claim 10, wherein storing the transformed copy of the web-based content to the data storage system comprises:
    storing the transformed copy of the web-based content to the data storage system that is accessible to multiple instances of the application respectively installed on multiple smart television devices, wherein each instance of the application in the multiple instances of the application is configured to obtain the transformed copy of the web-based content from the data storage system and present it to a corresponding display.

17. The system of claim 10, wherein the web-based content is updated over time, and wherein the at least one processor is configured to periodically or intermittently perform the accessing, creating, transforming and storing operations to enable updated versions of the web-based content to be presented by the application.

18. The system of claim 10, wherein transforming the copy of the web-based content into the form suitable for presentation to the display by the application comprises transforming the copy of the web-based content into multiple different formats each of which is associated with a different display type; and wherein the application is configured to obtain a transformed copy of the web-based content having a format that is associated with a display type of the display.

19. A non-transitory computer-readable medium having instructions stored thereon that, when executed by at least one computing device, cause the at least one computing device to perform operations for presenting web-based content to a display by an application installed on a smart television device, the operations comprising:

accessing the web-based content via a world wide web;

creating a copy of the web-based content;

transforming the copy of the web-based content into a form suitable for presentation to the display by the application, wherein the transformed copy of the web-based content comprises multiple images; and storing the transformed copy of the web-based content to a data storage system that is accessible to the application, wherein the application is configured to obtain the transformed copy of the web-based content from the data storage system and present it to the display, wherein the data storage system stores content and metadata.

20. The non-transitory computer-readable medium of claim 19, wherein the smart television device comprises:

a smart television that includes the display; or a media device that is separate from but communicatively connected to the display.

* * * * *